US008613630B2

(12) United States Patent
Henry et al.

(10) Patent No.: US 8,613,630 B2
(45) Date of Patent: Dec. 24, 2013

(54) LATCH ASSEMBLY FOR A PLUGGABLE ELECTRONIC MODULE

(75) Inventors: Randall Robert Henry, Harrisburg, PA (US); Michael John Phillips, Camp Hill, PA (US); Robert Charles Trea, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 81 days.

(21) Appl. No.: 13/430,125

(22) Filed: Mar. 26, 2012

(65) Prior Publication Data
US 2013/0252451 A1 Sep. 26, 2013

(51) Int. Cl.
*H01R 13/62* (2006.01)

(52) U.S. Cl.
USPC ........................................................ 439/372

(58) Field of Classification Search
USPC ............... 439/352, 372, 357, 159, 160, 76.1; 361/747, 728; 385/92, 134, 53
See application file for complete search history.

(56) References Cited

U.S. PATENT DOCUMENTS

| | | | | | |
|---|---|---|---|---|---|
| 5,879,173 | A | * | 3/1999 | Poplawski et al. | 439/138 |
| 6,805,573 | B2 | * | 10/2004 | Phillips et al. | 439/352 |
| 6,824,416 | B2 | * | 11/2004 | Di Mascio | 439/352 |
| 6,881,095 | B2 | * | 4/2005 | Murr et al. | 439/607.2 |
| 6,887,091 | B1 | * | 5/2005 | Wu | 439/352 |
| 6,916,196 | B2 | * | 7/2005 | Long et al. | 439/352 |
| 7,114,984 | B2 | * | 10/2006 | Shirk et al. | 439/372 |
| 7,507,103 | B1 | * | 3/2009 | Phillips et al. | 439/352 |
| 7,699,641 | B2 | * | 4/2010 | Bright et al. | 439/352 |
| 8,169,783 | B2 | * | 5/2012 | Phillips et al. | 361/728 |
| 8,267,718 | B2 | * | 9/2012 | Straka et al. | 439/497 |
| 8,308,377 | B2 | * | 11/2012 | Yi | 385/92 |
| 2005/0003696 | A1 | * | 1/2005 | Shirk et al. | 439/352 |
| 2006/0258201 | A1 | * | 11/2006 | Schwiebert et al. | 439/352 |
| 2010/0246142 | A1 | * | 9/2010 | Phillips et al. | 361/747 |

\* cited by examiner

*Primary Examiner* — Alexander Gilman (57) ABSTRACT

A latch assembly is provided for latching a pluggable electronic module to a receptacle assembly. The latch assembly includes a yoke assembly having an actuation end that is movable between a latched position and an unlatched position. A lever is operatively connected to the yoke assembly to move the actuation end of the yoke assembly between the latched and unlatched positions. A latch element is operatively connected to the actuation end of the yoke assembly. The latch element is movable along a latch axis between an extended position and a retracted position as the actuation end is moved between the latched and unlatched positions, respectively. The actuation end of the yoke assembly is configured to float along the latch axis relative to the latch element.

20 Claims, 7 Drawing Sheets

LATCH ASSEMBLY FOR A PLUGGABLE ELECTRONIC MODULE

BACKGROUND OF THE INVENTION

The subject matter described and/or illustrated herein relates generally to pluggable electronic modules.

Various types of fiber optic and metal based transceivers that permit communication between electronic host equipment and external devices are known. Such transceivers include a pluggable electronic module that is constructed according to various standards for size and compatibility, for example the Small Form Factor Pluggable (SFP) module standard, the 10 Gigabit Small Form Factor Pluggable (XFP) module standard, and the Quad Small Form Factor Pluggable (QSFP) module standard.

The pluggable electronic module(s) of a transceiver are plugged into a receptacle assembly that is mounted on a circuit board within the host equipment. The receptacle assembly includes a guide frame, or cage, having a front that is open to an interior compartment. An electrical connector is disposed at a rear of the cage within the interior compartment. When a pluggable electronic module is plugged into the receptacle assembly, and more specifically the interior compartment of the cage, the module mates with the electrical connector to electrically connect the module to the circuit board.

Pluggable electronic modules typically include a latch assembly that cooperates with a latch element on the cage to latch the module to the receptacle assembly. Specifically, the latch assembly of a pluggable electronic module includes a latch element that engages the latch element of the cage to hold the module within the interior compartment of the cage. But, an amount of over-travel of the pluggable electronic module into the interior compartment of the cage may be required to ensure that the latch element of the module sufficiently engages the latch element of the cage to latch the module to the cage. For example, an amount of over-travel of the pluggable electronic module into the interior compartment of the cage may be required to ensure that the latch element of the module is fully received and seated within an opening of the latch element of the cage. But, the over-travel may result in inconsistency in the seating depth of the pluggable electronic module within the interior compartment of the cage. As signal speeds continue to increase, the inconsistency in the seating depth of the pluggable electronic module may degrade the signal integrity of the transceiver. Accordingly, at least some known transceivers include a biasing feature (e.g., a spring) that urges the pluggable electronic module to a positive stop location once the latch elements have sufficiently engaged. But, urging the pluggable electronic module to the positive stop location may bind the latch assembly, which may make it difficult to actuate the latch assembly to unlatch the module from the cage.

BRIEF DESCRIPTION OF THE INVENTION

In one embodiment, a latch assembly is provided for latching a pluggable electronic module to a receptacle assembly. The latch assembly includes a yoke assembly having an actuation end that is movable between a latched position and an unlatched position. A lever is operatively connected to the yoke assembly to move the actuation end of the yoke assembly between the latched and unlatched positions. A latch element is operatively connected to the actuation end of the yoke assembly. The latch element is movable along a latch axis between an extended position and a retracted position as the actuation end is moved between the latched and unlatched positions, respectively. The actuation end of the yoke assembly is configured to float along the latch axis relative to the latch element.

In another embodiment, a pluggable electronic module includes a housing configured to be received within a receptacle assembly, and an electronic component held by the housing and configured to be mated with a connector of the receptacle assembly. The pluggable electronic module also includes a latch assembly configured to latch the housing within the receptacle assembly. The latch assembly includes a lever, a yoke assembly, and a latch element. The yoke assembly includes an actuation end that is movable between a latched position and an unlatched position. The lever is operatively connected to the yoke assembly to move the actuation end of the yoke assembly between the latched and unlatched positions. The latch element is operatively connected to the actuation end of the yoke assembly. The latch element is movable along a latch axis between an extended position and a retracted position as the actuation end is moved between the latched and unlatched positions, respectively. The actuation end of the yoke assembly is configured to float along the latch axis relative to the latch element.

In another embodiment, a transceiver assembly includes a receptacle assembly having a cage that includes an internal compartment and a biasing mechanism. The transceiver assembly also includes a pluggable electronic module having a housing configured to be received within the internal compartment of the cage. The pluggable electronic module further includes a latch assembly configured to latch the housing within the internal compartment. The latch assembly includes a yoke assembly and a latch element. The yoke assembly includes an actuation end that is movable between a latched position and an unlatched position. The latch element is operatively connected to the actuation end of the yoke assembly. The latch element is movable along a latch axis between an extended position and a retracted position as the actuation end is moved between the latched and unlatched positions, respectively. The biasing mechanism of the cage is engaged with the housing to urge the housing in a direction that forces the latch element into engagement with the cage when the latch element is in the extended position. The actuation end of the yoke assembly is configured to float along the latch axis relative to the latch element.

DETAILED DESCRIPTION OF THE INVENTION

Figure 1:
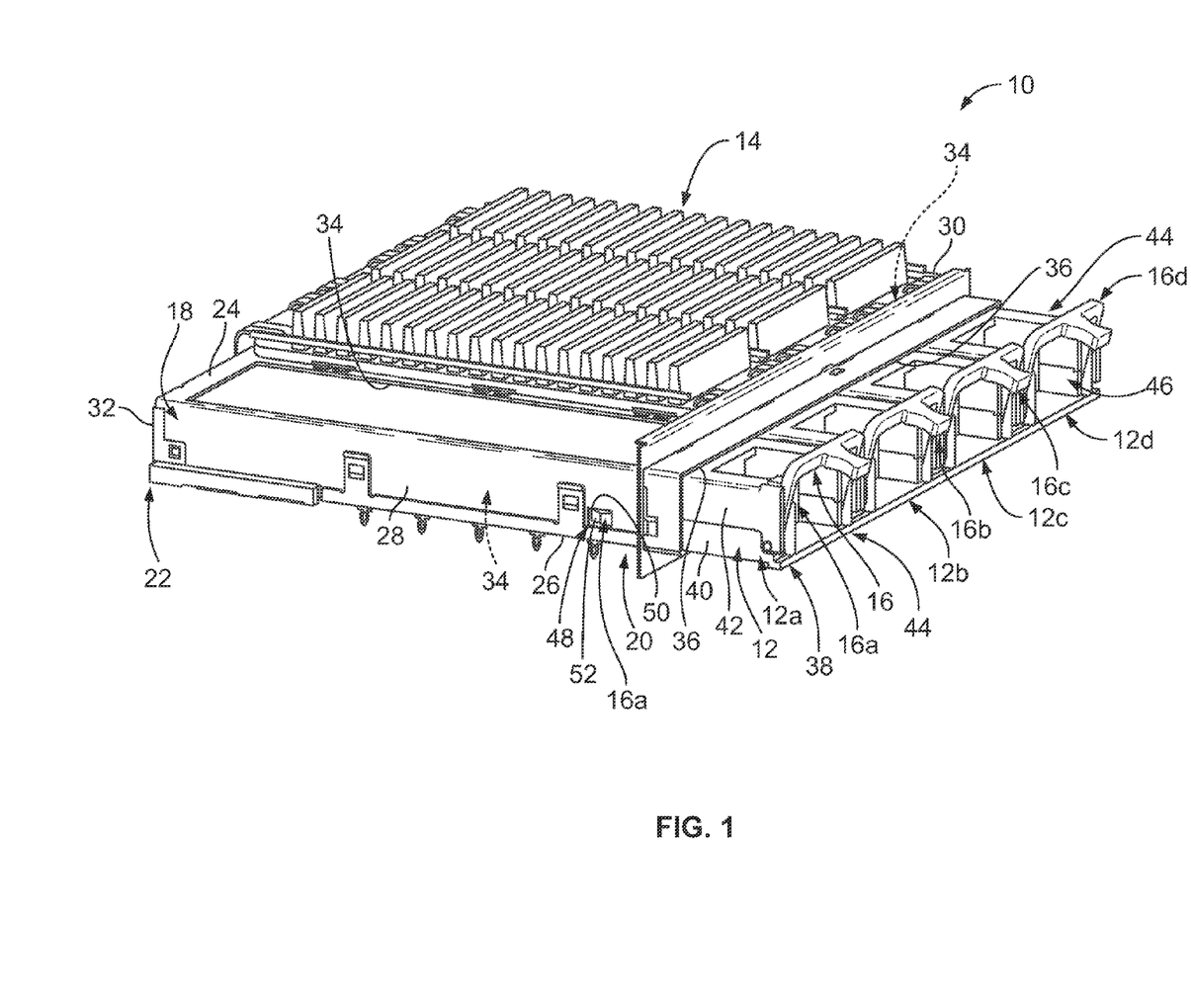
FIG. 1 is a perspective view of an exemplary embodiment of a transceiver assembly.

FIG. 1 is a perspective view of an exemplary embodiment of a transceiver assembly 10. In the exemplary embodiment, the transceiver assembly 10 is adapted to address, among other things, conveying data signals at high rates, such as data transmission rates of at least 10 gigabits per second (Gbps), which is required by the SFP+ standard. For example, in some embodiments the transceiver assembly 10 is adapted to convey data signals at a data transmission rate of at least 28 Gbps. Moreover, and for example, in some embodiments the transceiver assembly 10 is adapted to convey data signals at a data transmission rate of between approximately 20 Gbps and approximately 30 Gbps. It is appreciated, however, that the benefits and advantages of the subject matter described and/or illustrated herein may accrue equally to other data transmission rates and across a variety of systems and standards. In other words, the subject matter described and/or illustrated herein is not limited to data transmission rates of 10 Gbps or greater, any standard, or the exemplary type of transceiver assembly shown and described herein.

The transceiver assembly 10 includes one or more pluggable electronic modules 12 configured for pluggable insertion into a receptacle assembly 14 that is mounted on a host circuit board (not shown). The host circuit board may be mounted in a host system (not shown) such as, but not limited to, a router, a server, a computer, and/or the like. The host system typically includes a conductive chassis (not shown) having a panel (not shown) including one or more openings (not shown) extending therethrough in substantial alignment with the receptacle assembly 14. The receptacle assembly 14 is optionally electrically connected to the panel. In the exemplary embodiment, the transceiver assembly 10 includes four pluggable electronic modules 12a-d, but the assembly 10 may include any number of the modules 12. As will be described below, one or more of the pluggable electronic modules 12 includes a latch assembly 16 for latching the module 12 to the receptacle assembly 14.

The receptacle assembly 14 includes a cage 18 having one or more electrical connectors (not shown) positioned therein. The receptacle assembly 14 is positioned on the host circuit board for electrically connecting the pluggable electronic modules 12 to the host circuit board via the electrical connectors. A plug end 20 of the cage 18, through which the pluggable electronic modules 12 are installed into the receptacle assembly 14, may be configured to be mounted, or received, within an opening of the panel. For example, the panel may be a wall of a housing of a device (not shown), such as, but not limited to, a computer, that includes the host circuit board. In such an example, the receptacle assembly 14 enables pluggable electronic modules 12 located outside the housing to be electrically connected to the host circuit board contained within the housing.

The cage 18 extends between the plug end 20 and an opposite rear end 22. In the exemplary embodiment, the cage 18 includes a generally rectangular cross section, and includes an upper wall 24, a lower wall 26, side walls 28 and 30, and a rear wall 32. However, the cage 18 may include any suitable cross-sectional shape that enables the cage 18 to function as described and/or illustrated herein. The cage 18 may have an open bottom wherein the host circuit board defines the lower wall 26.

The cage 18 includes an internal chamber that is subdivided into a plurality of internal compartments 34, which are arranged in a row. Specifically, in the exemplary embodiment, the cage 18 includes three divider walls (not visible) that divide the internal chamber into four internal compartments 34. Each internal compartment 34 is configured to receive a pluggable electronic module 12 therein through a corresponding opening, or port, 36 at the plug end 20 that communicates with the corresponding internal compartment 34. For each internal compartment 34, the cage 18 may include an opening (not shown) extending through the lower wall 26. The openings within the lower wall 26 are adjacent the rear end 22 of the cage 18 for receiving a corresponding one of the electrical connectors within the corresponding internal compartment 34 of the cage 18. The openings within the lower wall 26 of the cage 18 also enable electrical connection between the electrical connectors and the host circuit board. Specifically, when the cage 18 is mounted on the host circuit board and the electrical connectors are positioned within the corresponding internal compartments 34, each electrical connector is electrically connected to the host circuit board. When the pluggable electronic modules 12 are plugged into the corresponding internal compartments 34, each pluggable electronic module 12 is plugged into and electrically connected to a corresponding electrical connector, thereby interconnecting the pluggable electronic modules 12 to the host circuit board.

Each of the pluggable electronic modules 12 includes a housing 38 having a lower shell, or base, 40 and an upper shell, or cover, 42 that are secured together to form a protective shell for an electronic component, such as a circuit board (not shown) and/or electrical contacts (not shown). The electrical component may, in some embodiments, carry electronic circuitry and devices that perform transceiver functions. During mating, the pluggable electronic module 12 is plugged into the corresponding port 36 of the receptacle assembly 14 and the electrical component of the module 12 is engaged with and electrically connected to the corresponding electrical connector of the receptacle assembly 14.

When the pluggable electronic module 12 is fully plugged into the receptacle assembly 14, a front end 44 of the pluggable electronic module 12 extends from the cage 18 at the plug end 20 thereof. The front end 44 of one or more of the pluggable electronic modules 12 may include a connector port 46 that is configured to receive a communication plug (not shown) therein, such as, but not limited to, a fiber optic connector or a modular plug. In some embodiments, the front end 44 of one or more of the pluggable electronic modules 12 includes a connector interface (not shown) that is configured to be joined to an optical fiber cable or an electrical cable.

Although the cage 18 is shown as including four internal compartments 34 arranged in a single row, the cage 18 may include any number of internal compartments 34, arranged in any number of rows and/or columns, for receiving any number of pluggable electronic modules 12. In some embodiments, the cage 18 includes only one internal compartment 34 for receiving only one pluggable electronic module 12.

The cage 18 includes one or more latch elements 48 for cooperating with the latch assembly 16 of one or more of the pluggable electronic modules 12. Each latch element 48 may have any suitable shape and may include any suitable structure that enables the latch element 48 to cooperate with a latch assembly 16 in a latching operation to secure the corresponding pluggable electronic module 12 to the cage 18. Moreover, each latch element 48 may have any suitable location on the cage 18 that enables the latch element 48 to cooperate with a latch assembly 16 in a latching operation to secure the corresponding pluggable electronic module 12 to the cage 18. In the exemplary embodiment, each latch element 48 is an opening 50 that extends through a corresponding one of the side walls 28 and 30 of the cage 18 and is configured to receive a latch element 52 of the latch assembly 16 of the corresponding module 12.

The cage 18 may include any number of the latch elements 48 for cooperating with the latch assembly 16 of any number of the pluggable electronic modules 12. In the exemplary embodiment, the cage 18 includes two latch elements 48. One of the latch elements 48 extends through the side wall 28 for cooperating with the latch assembly 16a of a corresponding pluggable electronic module 12a. The other latch element 48 (not visible) extends through the side wall 30 for cooperating with the latch assembly 16d of a corresponding pluggable electronic module 12d. In the exemplary embodiment, the cage 18 does not include any latch elements 48 for cooperating with latch assemblies 16b and 16c of the pluggable electronic modules 12b and 12c, respectively. In embodiments wherein the cage 18 does not include any latch elements 48 for cooperating with latch assemblies 16b and 16c, the pluggable electronic modules 12b and/or 12c may not include the latch assemblies 16a and/or 16b, respectively. In some alternative embodiments, one or more of the divider walls of the cage 18 includes one or more latch elements 48 for cooperating with the latch assembly 16b and/or 16c of the pluggable electronic modules 12b and/or 12c, respectively. Moreover, one or more of the divider walls may include a latch element 48 for cooperating with another latch element 52 of the latch assembly 16a, and/or one or more of the divider walls may include a latch element 48 for cooperating with another latch element 52 of the latch assembly 16d.

Figure 2:
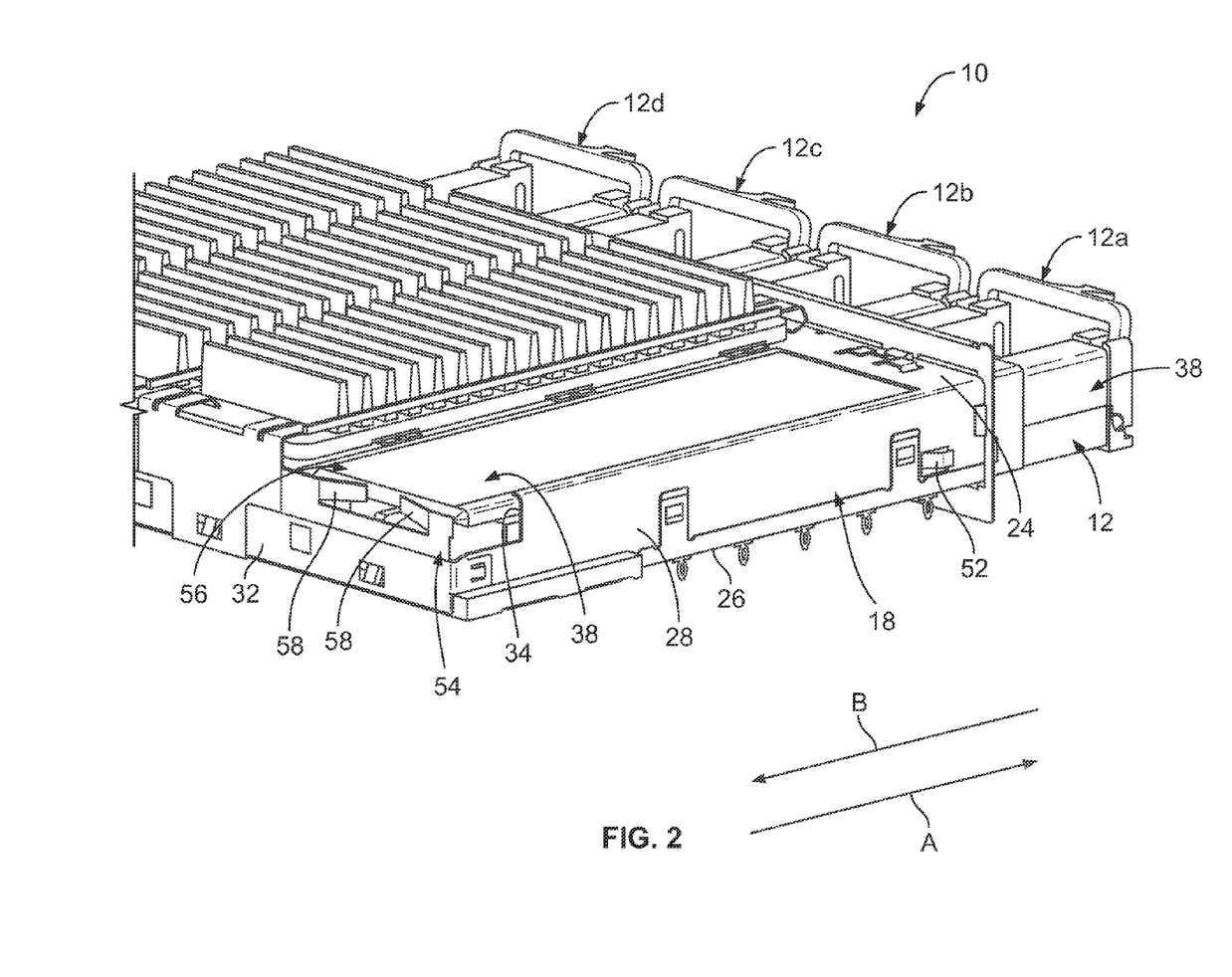
FIG. 2 is another perspective view of a portion of the transceiver assembly shown in FIG. 1 viewed from a different angle than FIG. 1.

FIG. 2 is another perspective view of a portion of the transceiver assembly 10 viewed from a different angle than FIG. 1. A portion of the upper wall 24 of the cage 18 has been removed from FIG. 2 for clarity. The cage 18 includes one or more biasing mechanisms 54 that engage a corresponding pluggable electronic module 12 to urge the module 12 to a positive stop location within the cage 18. Specifically, the biasing mechanism 54 engages the housing 38 of the corresponding pluggable module 12 to urge, or bias, the module 12 in the direction of the arrow A to the positive stop location shown in FIG. 2. The positive stop location may provide a consistent seating depth of the pluggable electronic modules 12a-12d within the interior compartments 34 of the cage 18. In other words, rear ends 56 of the pluggable electronic modules 12a-12d may be aligned along a direction B when the modules 12a-12d are in the positive stop locations. As will be described below, the latch element 52 of the pluggable electronic module 12a and/or the latch element 52 (not visible) of the module 12d may be engaged with the cage 18 when the corresponding module 12a and/or 12d is in the positive stop location.

In the exemplary embodiment, the biasing mechanism 54 is a spring that includes one or more spring arms 58 that engage the housing 38 of the corresponding pluggable electronic module 12 to urge the module 12 in the direction A. But, the biasing mechanism 54 may additionally or alternatively include any other structure, such as, but not limited to, a coil spring and/or the like. Although two are shown, the biasing mechanism 54 may include any number of the spring arms 58. In the exemplary embodiment, the biasing mechanism 54 is a discrete component of the cage 18 that is mounted along the rear wall 32 of the cage 18. Alternatively, the biasing mechanism 54 is integrally formed with the upper wall 24, the rear wall 32, the lower wall 26, the side wall 28, and/or the side wall 30 (FIG. 1) of the cage 18.

Figure 3:
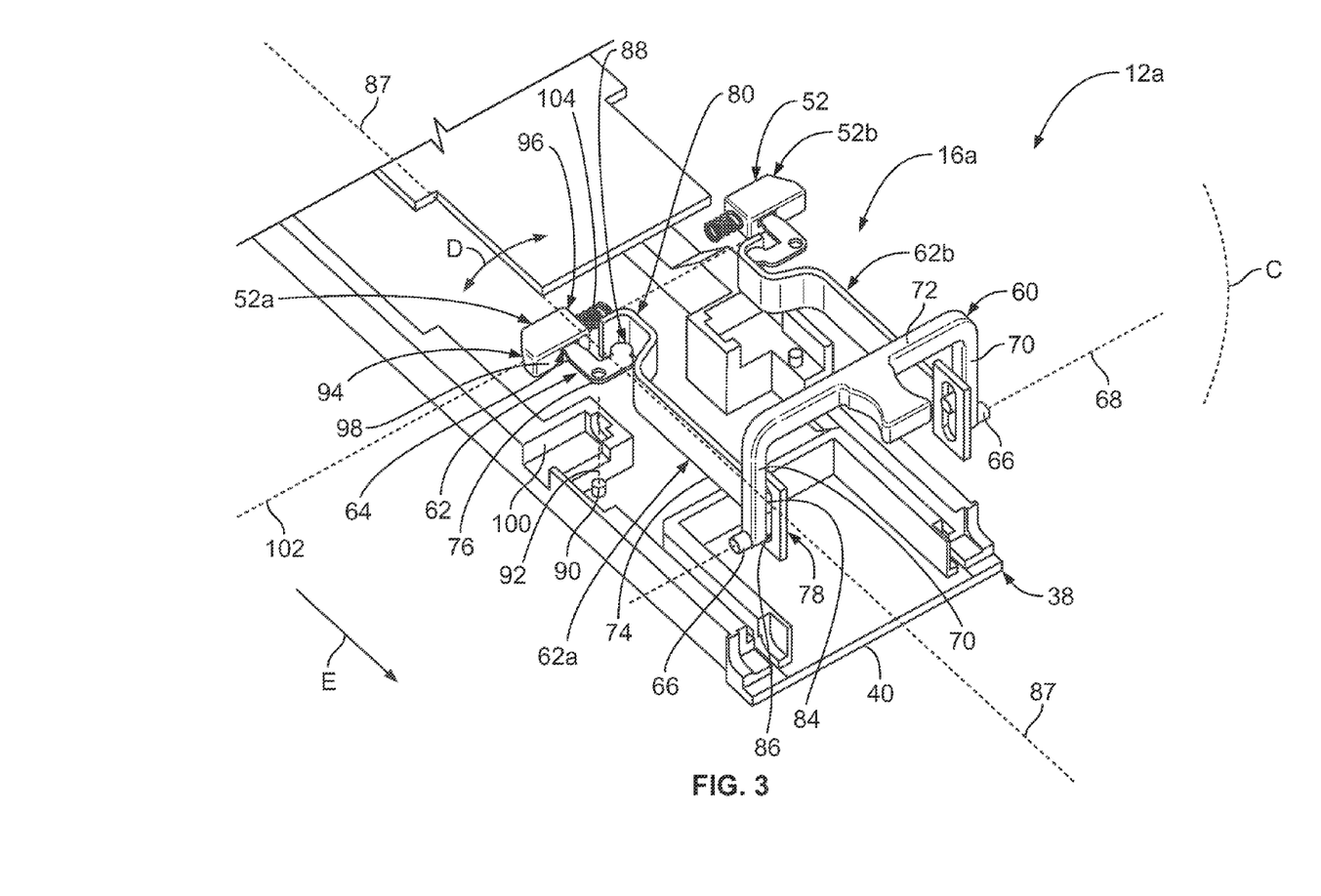
FIG. 3 is an exploded perspective view of a portion of an exemplary embodiment of a pluggable electronic module of the transceiver assembly shown in FIGS. 1 and 2.
Figure 4:
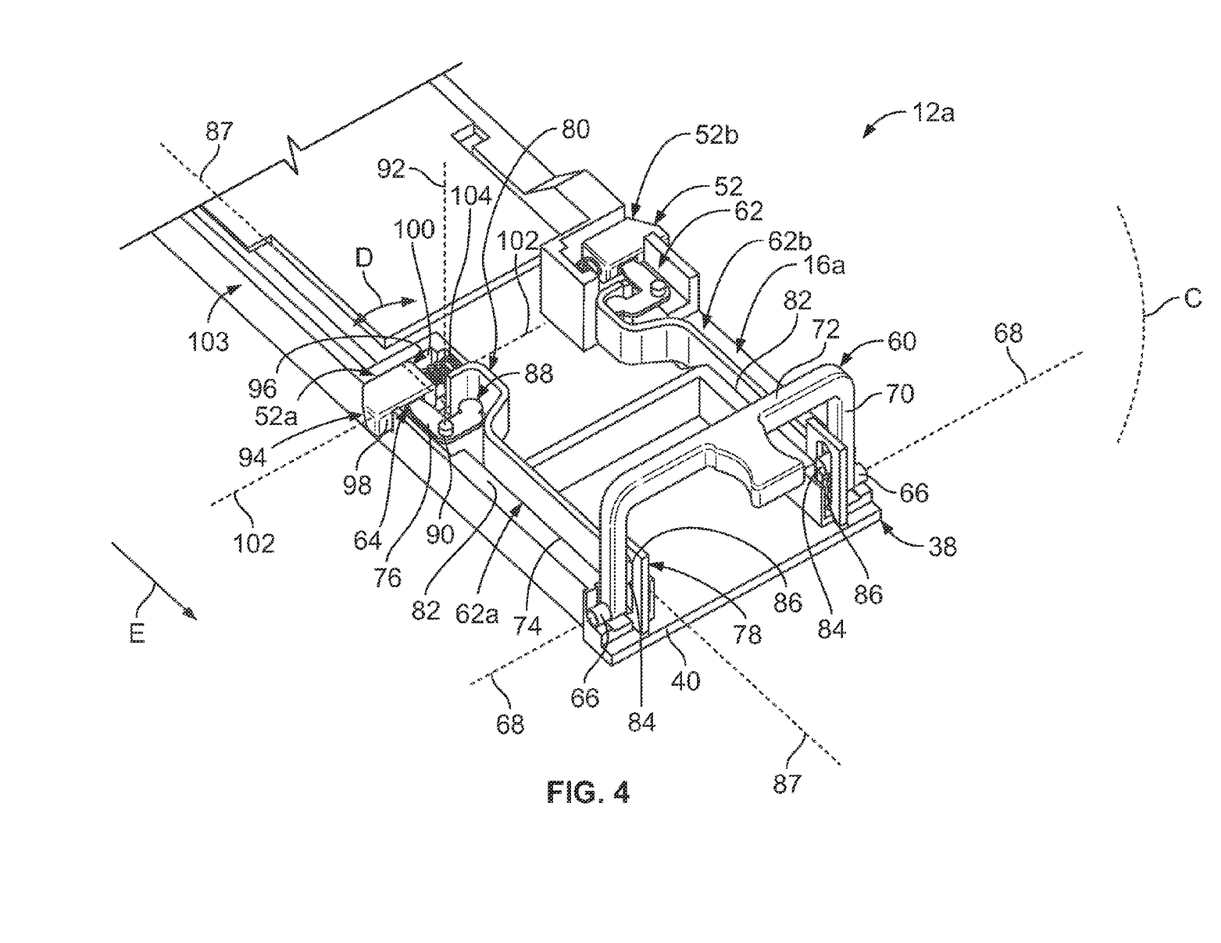
FIG. 4 is an unexploded perspective view of a portion of the pluggable electronic module shown in FIG. 3.

FIG. 3 is an exploded perspective view of a portion of an exemplary embodiment of the pluggable electronic module 12a. FIG. 4 is an unexploded perspective view of a portion of the pluggable electronic module 12a. The upper shell 42 of the housing 38 of the pluggable electronic module 12a has been removed from FIGS. 3 and 4 to illustrate internal components of the latch assembly 16a. The latch assemblies 16b-16d (FIG. 1) are substantially identical to the latch assembly 16a. Accordingly, only the latch assembly 16a will be described in more detail herein.

Figure 6:
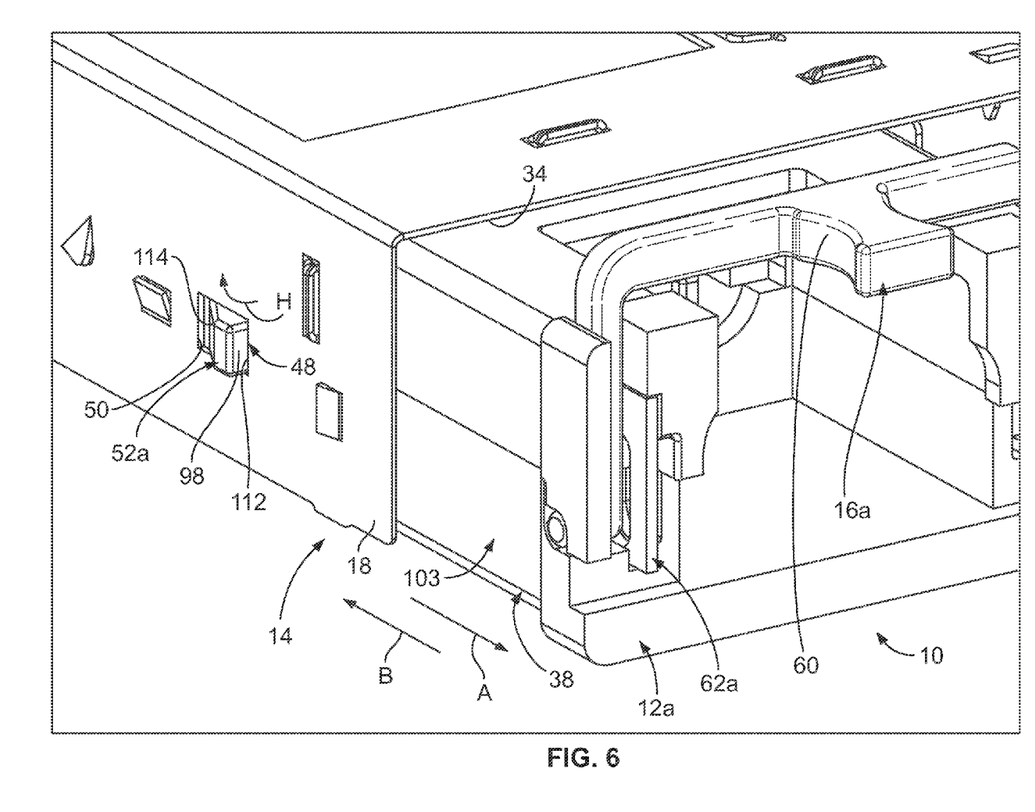
FIG. 6 is an enlarged perspective view of a portion of the transceiver assembly shown in FIGS. 1 and 2 illustrating the pluggable electronic module shown in FIGS. 3 and 4 latched to a receptacle assembly of the transceiver assembly.

Referring now to FIGS. 3 and 4, the latch assembly 16a includes a lever 60, one or more yoke assemblies 62, and one or more of the latch elements 52. The lever 60 is operatively connected to the yoke assembly 62 for moving an actuation end 64 of the yoke assembly 62 between a latched and an unlatched position. The latch element 52 is operatively connected to the actuation end 64 of the yoke assembly 62 for moving between an extended position and a retracted position as the actuation end 64 is moved between the latched and unlatched positions. In the extended position, the latch element 52 is received within the opening 50 (FIGS. 1 and 6) of the latch element 48 to facilitate holding the pluggable electronic module 12a within the corresponding internal compartment 34 of the cage 18 (FIGS. 1 and 6). As will be described below, the actuation end 64 of the yoke assembly 62 is configured to float relative to the latch element 52.

The latch assembly 16a is shown in FIGS. 3 and 4 with two yoke assemblies 62a and 62b and two latch elements 52a and 52b. The latch element 52a is shown in FIG. 1 and is configured to cooperate with the latch element 48 (FIGS. 1 and 6) of the side wall 28 (FIGS. 1 and 6) of the cage 18. The latch element 52b is configured to cooperate with a latch element 48 (not shown) of the corresponding divider wall (not shown). In other embodiments, the latch assembly 16a does not include the yoke assembly 62b and does not include the latch element 52b, for example in embodiments wherein the corresponding divider wall does not include a latch element 48. The yoke assemblies 62a and 62b are substantially identical and therefore only the yoke assembly 62a will be described in more detail herein. The latch elements 52a and 52b are substantially identical and therefore only the latch element 52a will be described in more detail herein.

The lever 60 is operatively connected to the lower shell 40 for rotating between a latched position and an unlatched position. The lever 60 is shown in the latched position in FIGS. 3 and 4. In the exemplary embodiment, the lever 60 includes a rotator pin 66 that is held by the housing 38 of the pluggable electronic module 12a. The lever 60 is configured to rotate about an axis of rotation 68 of the rotator pin 66 along an arc C. The lever 60 rotates along the arc C between the latched and unlatched positions. In the exemplary embodiment, the rotator pin 66 is captured between the lower shell 40 and the upper shell 42 of the housing 38. Alternatively, the rotator pin 66 may be held within the lower shell 40 or the upper shell 42.

In the exemplary embodiment, the lever 60 includes a pair of arms 70 and a handle 72 extending between the arms 70. Optionally, a tether, or pull tab, (not shown) may extend from the handle 72. The tether may be pulled to rotate the lever 60 from the latched position to the unlatched position, and may be pushed to rotate the lever 60 from the unlatched position to the latched position.

The yoke assembly 62a includes an actuator arm 74 and a latch actuator 76. The actuator arm 74 extends from a lever end 78 to an actuator end 80. The actuator arm 74 may extend within a channel 82 of the lower shell 40. The actuator arm 74 is operatively connected to the lever 60 at the lever end 78. In the exemplary embodiment, the actuator arm 74 is operatively connected to the lever 60 via a pin 84 of the actuator arm 74 that extends within an opening 86 of the lever 60. The actuator arm 74 is operatively connected to the lever 60 such that as the lever 60 rotates between the latched and unlatched positions, the actuator arm 74 moves along an approximately linear path indicated by the movement axis 87. The opening 86 may be an elongate slot and the pin 84 may move along the length of the slot as the lever 60 and actuator arm 74 move. In some alternative embodiments, the actuator arm 74 includes the opening 86 and the lever 60 includes the pin 84. Moreover, the lever 64 may be integrally formed with the actuator arm 74 in some alternative embodiments.

The latch actuator 76 includes an arm end 88. The latch actuator 76 also includes the actuation end 64 of the yoke assembly 62. The latch actuator 76 is held on a rotator pin 90 of the housing 38. The latch actuator 76 is configured to rotate about an axis of rotation 92 along an arc D. The latch actuator 76 rotates along the arc D such that the actuation end 64 rotates between a latched and an unlatched position. The arm end 88 of the latch actuator 76 is operatively connected to the lever end 78 of the actuator arm 74 for rotating along the arc D. Specifically, the lever end 78 of the actuator arm 74 engages the arm end 88 of the latch actuator 76 to rotate the actuation end 64 of the latch actuator 76 to the unlatched position as the actuator arm 74 moves along the movement axis 87 in the direction E. Accordingly, the lever 60 is operatively connected to the yoke assembly 62 for moving the actuation end 64 of the latch actuator 76 between the latched and unlatched positions.

The latch element 52a extends from a tip end 94 to an opposite spring end 96. The latch element 52a includes an latching face 98 that extends between the ends 94 and 96. The latch element 52a may extend within a channel 100 of the housing 38.

The latch element 52a is operatively connected to the actuation end 64 of the latch actuator 76 for moving between the extended and retracted positions as the actuation end 64 is moved between the latched and unlatched positions. Specifically, the latch element 52a is movable along a latch axis 102 between the extended and retracted positions. The latch element 52a is shown in the extended position in FIGS. 3 and 4. In the extended position, the latch element 52a extends outwardly from a side 103 of the housing 38 of the pluggable electronic module 12a, as can be seen in FIG. 4. In the exemplary embodiment, the latch axis 102 is approximately linear such that the latch element 52a moves along an approximately linear path between the engaged and retracted positions.

The latch assembly 16a includes a return spring 104. The return spring 104 is biased against the spring end 96 of the latch element 52a and generally urges the latch element 52a to the extended position. In the exemplary embodiment, the return spring 104 is represented by a coil spring, however other types of biasing mechanisms may be used to urge the latch element 52a to the extended position.

Figure 5:
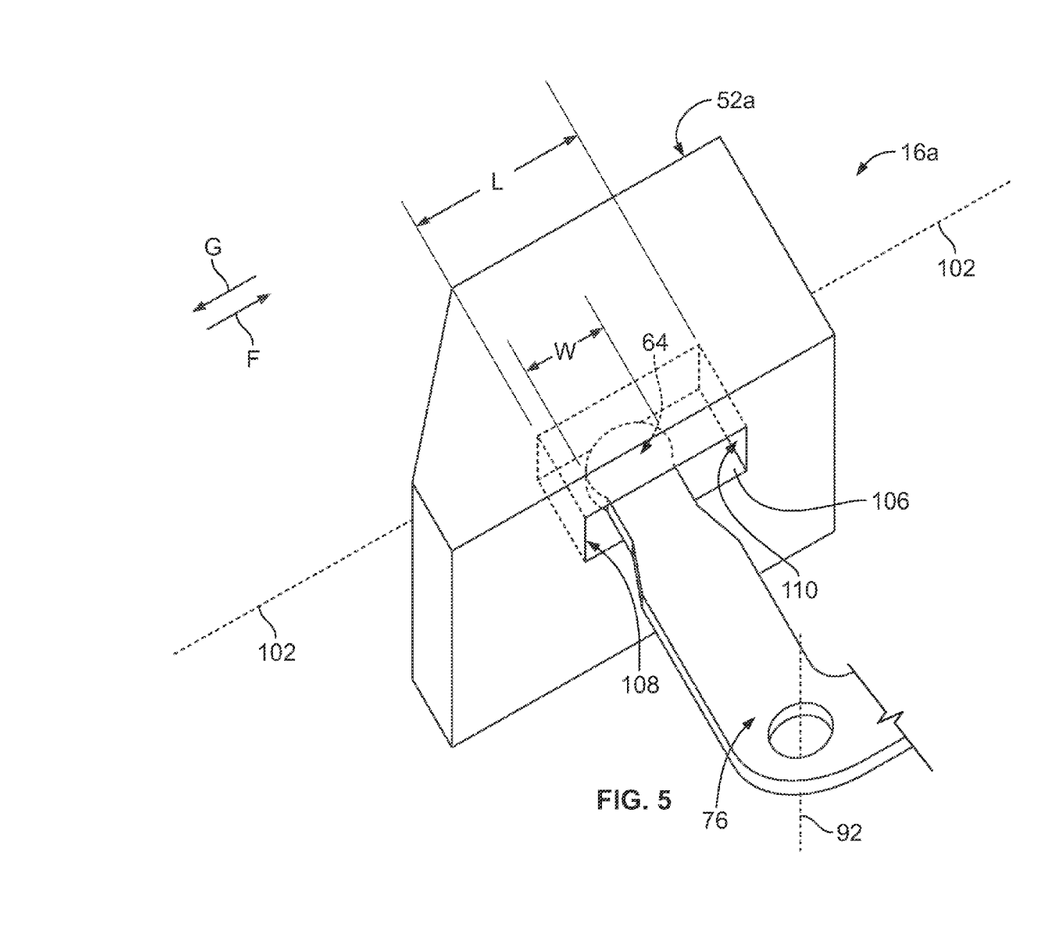
FIG. 5 is an enlarged perspective view of a portion of an exemplary embodiment of a latch assembly of the pluggable electronic module shown in FIGS. 3 and 4.

FIG. 5 is an enlarged perspective view of a portion of the latch assembly 16a illustrating the operative connection between the actuation end 64 of the latch actuator 76 and the latch element 52a. The latch element 52a includes an opening 106 that extends a length L along the latch axis 102 from a latching end 108 to a unlatching end 110. The actuation end 64 of the latch actuator 76 extends within the opening 106 of the latch element 52a. The actuation end 64 extends a width W along the latch axis 102 that is less than the length L of the opening 106. The actuation end 64 is configured to engage the unlatching end 110 of the opening 106 to move the latch element 52a toward the retracted position.

As described above, the actuation end 64 of the latch actuator 76 is configured to float relative to the latch element 52a. In the exemplary embodiment, the actuation end 64 is configured to float within the opening 106 between the latching end 108 and the unlatching end 110. In other words, the actuation end 64 is free to move within the opening 106 along the length of the opening and along the latch axis 102 as the actuation end 64 rotates about the axis of rotation 92. For example, the actuation end 64 of the latch actuator 76 is configured to move within the opening 106 along the latch axis 102 in the direction F toward the unlatching end 110. The actuation end 64 is also configured to move within the opening 106 along the latch axis 102 in the opposite direction G toward the latching end 110. In the exemplary embodiment, the actuation end 64 is capable of floating within the opening 106 because the width W of the actuation end 64 is less than the length L of the opening 106.

The floating of the actuation end 64 of the latch actuator 76 within the opening 106 enables the actuation end 64 to float relative to the latch element 52a. In other words, the floating of the actuation end 64 enables relative movement between the latch element 52a and the actuation end 64 of the latch actuator 76. As will be described below, floating of the actuation end 64 relative to the latch element 52a isolates the forces exerted by the biasing mechanism 54 on the pluggable electronic module 12a from the yoke assembly 62.

In the exemplary embodiment, the opening 106 is an elongate slot, but the opening 106 may additionally or alternatively include any other shape that enables the actuation end 64 of the latch actuator 76 to float relative to the latch element 52a.

FIG. 6 is an enlarged perspective view of a portion of the transceiver assembly 10 illustrating the latch assembly 16a in a latched state wherein the pluggable electronic module 12a is latched to the receptacle assembly 14. The pluggable electronic module 12a is received within the corresponding internal compartment 34 of the cage 18 of the receptacle assembly 14. The biasing mechanism 54 (FIG. 2) engages the housing 38 of the pluggable electronic module 12a such that the module 12a is urged in the direction A to the positive stop location. The pluggable electronic module 12a is shown in the positive stop location in FIG. 6.

The latch element 52a is engaged with the latch element 48 of the receptacle assembly 14 to latch the pluggable electronic module 12a within the corresponding internal compartment 34. Specifically, the latch element 52a is in the extended position wherein the latch element 52a extends outwardly from the side 103 of the housing 38 of the pluggable electronic module 12a. The latch element 52a extends into the opening 50 of the latch element 48 of the cage 18. The latching face 98 of the latch element 52a is engaged with an edge 112 of the cage 18 that defines the opening 50 to resist removal of the pluggable electronic module 12a from the corresponding internal compartment 34. In other words, the engagement between the latching face 98 and the edge 112 facilitates preventing the pluggable electronic module 12a from being pulled out of the corresponding internal compartment 34 in the direction A. When the latch assembly 16a is in the latched state, such as in the position illustrated in FIGS. 4 and 6, the lever 60 and the yoke assembly 62a are in the latched positions.

The latch element 52a may include a ramp surface 114 that is opposite to the latching face 98. As the pluggable electronic module 12a is inserted into the corresponding internal compartment 34, the ramp surface 114 may engage that cage 18 to move the latch element 52a toward the retracted position, against the bias of return spring 104 (FIGS. 3, 4, and 7), such that the latch element 52a can clear the cage 18. Once the pluggable electronic module 12a is inserted far enough into the corresponding internal compartment 34 such that the latch element 52a is aligned with the opening 50, the return spring 104 forces the latch element 52a into the opening 50 and to the extended position.

When the pluggable electronic module 12a is latched within the cage 18 as shown in FIG. 6, the bias provided by the biasing mechanism 54 that biases the pluggable electronic module 12a to the positive stop location causes a force to be exerted on the latching element 52a. Specifically, the bias provided by the biasing mechanism 54 causes the edge 112 of the opening 50 to exert a force on the latching face 98 of the latching element 52a in the direction B. The force in the direction B exerted by the edge 112 on the latching element 52a may cause the latching element to experience a moment H.

If the actuation end 64 (FIGS. 3-5 and 7) of the latch actuator 76 (FIGS. 3-5 and 7) was not capable of floating relative to the latch element 52a, the moment H may bind the yoke assembly 62a, which may make it more difficult to actuate the latch assembly 16a to the unlatched position. For example, if the yoke assembly 62a is bound as described above, attempting to move the lever 60 from the latched position to the unlatched position may work against moving the latch element 52a to the retracted position. But, because the actuation end 64 of the yoke assembly 62a can float relative to the latch element 52a, the moment H experienced by the latch element 52a is not transferred to the actuation end 64 of the yoke assembly 62a. In other words, floating of the actuation end 64 relative to the latch element 52a isolates the forces exerted by the biasing mechanism 54 on the pluggable electronic module 12a from the yoke assembly 62a. For example, when the latch element 52a experiences the moment H, the actuation end 64 of the yoke assembly 62a moves within the opening 106 (FIGS. 5 and 7) relative to the latch element 52a, such that the moment H is not transferred to the actuation end 64 of the yoke assembly 62a.

Figure 7:
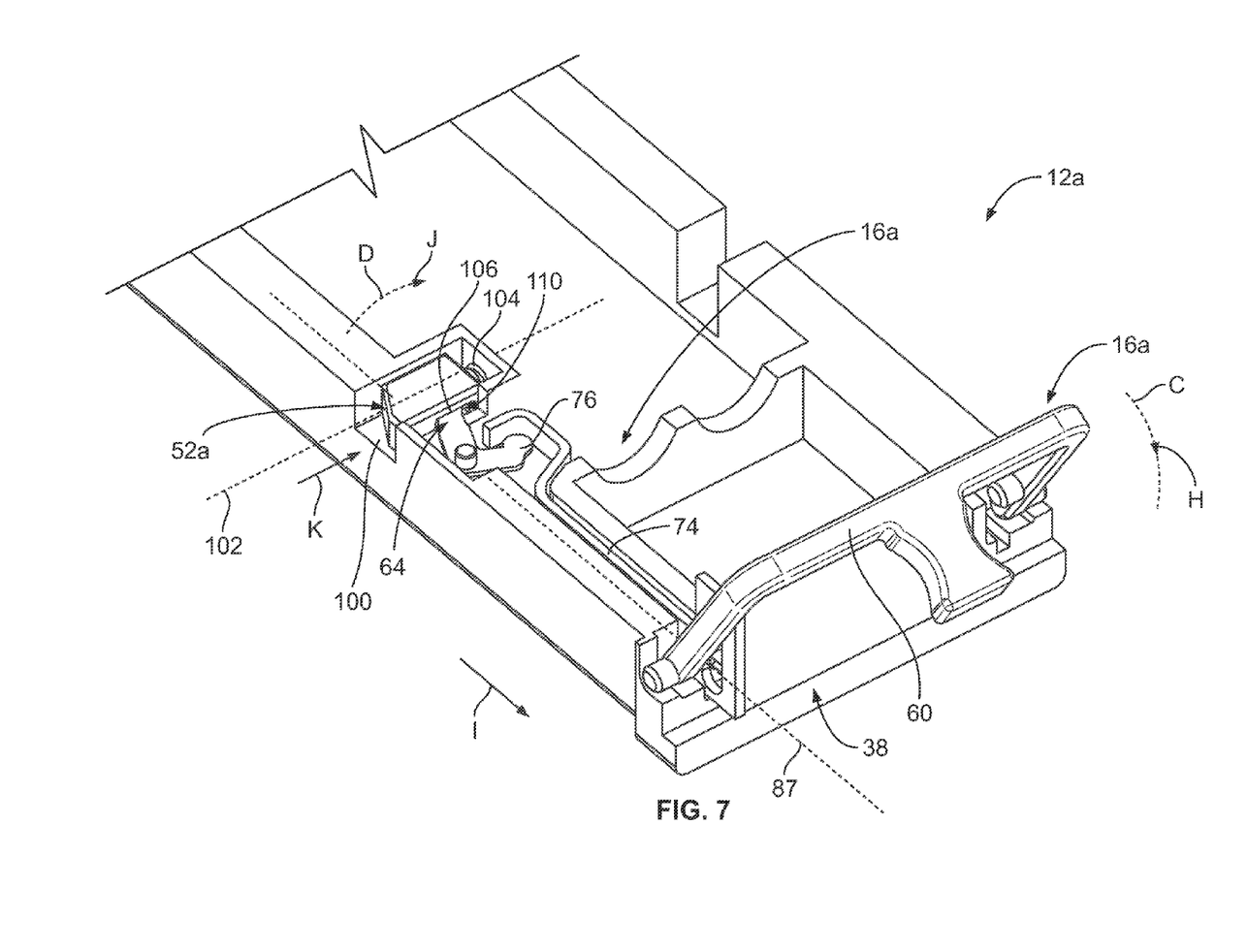
FIG. 7 is a perspective view of a portion of the pluggable electronic module shown in FIGS. 3 and 4 illustrating the latch assembly shown in FIG. 5 in an unlatched state.

FIG. 7 is a perspective view of a portion of the pluggable electronic module 12a illustrating the latch assembly 16a in an unlatched state. The upper shell 42 of the housing 38 of the pluggable electronic module 12a has been removed from FIG. 7 for clarity. To actuate the latch assembly 16a from the latched state shown in FIGS. 3, 4, and 6 to the unlatched state, the lever 60 is actuated from the latched position to the unlatched position by rotating the lever 60 along the arc C in the direction H. As the lever 60 rotates in the direction H, the actuator arm 74 moves along the movement axis 87 in the direction I, which rotates the latch actuator 76 along the arc D in the direction J from the latched position to the unlatched position. The actuation end 64 of the actuator arm moves within the opening 106 of the latch element 52a into engagement with the unlatching end 110 of the opening 106. As the actuation end 64 continues to move in the direction J toward the unlatched position, the actuation end 64 forces latch element 52a, against the bias of the return spring 104, to move along the latch axis 102 in the direction K toward the retracted position. In other words, the latch element 52a is retracted out of the opening 50 (FIGS. 1 and 6) and further into the channel 100 of the module housing 38. Once the latch element 52a is fully retracted (e.g., has cleared the edge 112 (FIG. 6), the pluggable electronic module 12a can be removed from the corresponding internal compartment 34 (FIGS. 1 and 6).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A latch assembly for latching a pluggable electronic module to a receptacle assembly, the latch assembly comprising:
   a yoke assembly having an actuation end that is movable between a latched position and an unlatched position;
   a lever operatively connected to the yoke assembly to move the actuation end of the yoke assembly between the latched and unlatched positions; and
   a latch element operatively connected to the actuation end of the yoke assembly, the latch element being movable along a latch axis between an extended position and a retracted position as the actuation end is moved between the latched and unlatched positions, respectively, wherein the actuation end of the yoke assembly is configured to float along the latch axis relative to the latch element.

2. The latch assembly of claim 1, wherein the latch element comprises an opening that extends a length along the latch axis, the actuation end of the yoke assembly extending within the opening and being configured to float within the opening.

3. The latch assembly of claim 1, wherein the latch element comprises an opening that extends a length along the latch axis from a latching end to an unlatching end, the actuation end of the yoke assembly extending within the opening, the actuation end being configured to float within the opening between the latching and unlatching ends, the actuation end being configured to engage the unlatching end of the opening to move the latch element to the retracted position.

4. The latch assembly of claim 1, wherein the latch axis is approximately linear such that the latch element moves along an approximately linear path between the engaged and unengaged positions.

5. The latch assembly of claim 1, wherein the latch element comprises an opening that extends a length along the latch axis from a latching end to an unlatching end, the actuation end of the yoke assembly extending within the opening, wherein the actuation end extends a width along the latch axis that is less than the length of the opening.

6. The latch assembly of claim 1, wherein the yoke assembly comprises an actuator arm and a latch actuator, the latch actuator including the actuation end of the yoke assembly, the lever being operatively connected to the actuator arm to move the actuator arm as the lever moves, the actuator arm being operatively connected to the latch actuator to move the actuation end of the latch actuator between the latched and unlatched positions as the actuator arm moves.

7. The latch assembly of claim 1, wherein the yoke assembly comprises a latch actuator that includes the actuation end of the yoke assembly, the latch actuator being configured to rotate to move the actuation end between the latched and unlatched positions.

8. The latch assembly of claim 1, further comprising a return spring configured to be held within the pluggable electronic module, the return spring engaging the latch element to urge the latch element to the extended position.

9. The latch assembly of claim 1, wherein the yoke assembly comprises an actuator arm and a latch actuator, the latch actuator including the actuation end of the yoke assembly, the lever being operatively connected to the actuator arm to move the actuator arm along an approximately linear path as the lever moves, the actuator arm being operatively connected to the latch actuator to rotate the actuation end of the latch actuator between the latched and unlatched positions as the actuator arm moves along the approximately linear path.

10. The latch assembly of claim 1, wherein the latch element comprises an elongate slot that extends a length along the latch axis, the actuation end of the yoke assembly extending within the slot and being configured to float within the slot.

11. The latch assembly of claim 1, wherein the latch element is configured to be received within an opening of the receptacle assembly when the latch element is in the extended position.

12. A pluggable electronic module comprising:
a housing configured to be received within a receptacle assembly;
an electronic component held by the housing and configured to be mated with a connector of the receptacle assembly; and
a latch assembly configured to latch the housing within the receptacle assembly, the latch assembly comprising a lever, a yoke assembly, and a latch element, the yoke assembly including an actuation end that is movable between a latched position and an unlatched position, the lever operatively connected to the yoke assembly to move the actuation end of the yoke assembly between the latched and unlatched positions, the latch element being operatively connected to the actuation end of the yoke assembly, the latch element being movable along a latch axis between an extended position and a retracted position as the actuation end is moved between the latched and unlatched positions, respectively, wherein the actuation end of the yoke assembly is configured to float along the latch axis relative to the latch element.

13. The pluggable electronic module of claim 12, wherein the housing includes a channel formed therein, the latch element being received within and being movable within the channel.

14. The pluggable electronic module of claim 12, wherein the housing includes an upper wall, a lower wall, and opposite side walls that extend from the upper wall to the lower wall, the latch element extending along one of the side walls of the housing.

15. The pluggable electronic module of claim 12, wherein the latch element is configured to be received within an opening of the receptacle assembly when the latch element is in the extended position.

16. The pluggable electronic module of claim 12, wherein the latch element comprises an opening that extends a length along the latch axis from a latching end to an unlatching end, the actuation end of the yoke assembly extending within the opening, the actuation end being configured to float within the opening between the latching and unlatching ends, the actuation end being configured to engage the unlatching end of the opening to move the latch element to the retracted position.

17. The pluggable electronic module of claim 12, wherein the latch element comprises an opening that extends a length along the latch axis from a latching end to an unlatching end, the actuation end of the yoke assembly extending within the opening, wherein the actuation end extends a width along the latch axis that is less than the length of the opening.

18. The pluggable electronic module of claim 12, wherein the yoke assembly comprises an actuator arm and a latch actuator, the latch actuator including the actuation end of the yoke assembly, the lever being operatively connected to the actuator arm to move the actuator arm as the lever moves, the actuator arm being operatively connected to the latch actuator to move the actuation end of the latch actuator between the latched and unlatched positions as the actuator arm moves.

19. The pluggable electronic module of claim 12, further comprising a return spring held within the housing, the return spring engaging the latch element to urge the latch element to the engaged position.

20. A transceiver assembly comprising:
a receptacle assembly having a cage that includes an internal compartment and a biasing mechanism; and
a pluggable electronic module comprising a housing configured to be received within the internal compartment of the cage, the pluggable electronic module further comprising a latch assembly configured to latch the housing within the internal compartment, the latch assembly comprising a yoke assembly and a latch element, the yoke assembly including an actuation end that is movable between a latched position and an unlatched position, the latch element being operatively connected to the actuation end of the yoke assembly, the latch element being movable along a latch axis between an extended position and a retracted position as the actuation end is moved between the latched and unlatched positions, respectively, the biasing mechanism of the cage being engaged with the housing to urge the housing in a direction that forces the latch element into engagement with the cage when the latch element is in the extended position, wherein the actuation end of the yoke assembly is configured to float along the latch axis relative to the latch element.

* * * * *